(12) United States Patent
Mérant et al.

(10) Patent No.: US 7,549,279 B2
(45) Date of Patent: Jun. 23, 2009

(54) MECHANISM FOR MOUNTING AGRICULTURAL EQUIPMENT TO A MULTI-PURPOSE SELF-PROPELLED STRADDLE CARRIER

(75) Inventors: Jean-Camille C. R. Mérant, Meigné-sous-Doué (FR); Guy M. A. H. Bossard, Saint-Révérend (FR); Jean-Paul Berthet, La Chaize-Giraud (FR)

(73) Assignee: CNH France S.A. (FR)

( * ) Notice: Subject to any disclaimer, the term of this patent is extended or adjusted under 35 U.S.C. 154(b) by 482 days.

(21) Appl. No.: 10/549,224

(22) PCT Filed: Mar. 12, 2004

(86) PCT No.: PCT/EP2004/050301

§ 371 (c)(1),
(2), (4) Date: Nov. 9, 2006

(87) PCT Pub. No.: WO2004/080155

PCT Pub. Date: Sep. 23, 2004

(65) Prior Publication Data

US 2007/0157592 A1    Jul. 12, 2007

(30) Foreign Application Priority Data

Mar. 13, 2003    (FR) .................................... 03 03090

(51) Int. Cl.
*A01D 34/00*    (2006.01)

(52) U.S. Cl. .......................... 56/15.6; 56/328.1; 56/330

(58) Field of Classification Search .................. 56/15.6, 56/328.1, 330, 472; 180/326, 329, 327, 330, 180/900, 6.48; 280/456.1, 210, 467, 468; 414/715; 172/306, 297, 298, 307, 273
See application file for complete search history.

(56) References Cited

U.S. PATENT DOCUMENTS 2,401,183 A * 5/1946 Pool et al. .................... 172/273

(Continued)

FOREIGN PATENT DOCUMENTS

DE            19 06 634 A      8/1970

(Continued)

*Primary Examiner*—Árpád Fábián-Kovács
(74) *Attorney, Agent, or Firm*—Rebecca Henkel

(57) ABSTRACT

The mounting mechanism comprise: on the straddle carrier side, a main frame mounted on wheels and suitable for selective lifting and lowering of the main frame in relation to the ground; on the equipment side, an auxiliary frame suitable for fixing to the main frame using detachable connection mechanism allowing it to be detached; and of a number of struts for supporting the auxiliary frame on the ground when the auxiliary frame is separated from the main frame. The main frame and the auxiliary frame both comprise a pair of parallel, substantially horizontal girders. One of the frames comprises mechanism for longitudinal guidance able to co-operate with the girders on the other frame to guide the two frames in along each other, when the main frame moves longitudinally with respect to the auxiliary frame supported by the struts. At least one of the frames includes a stop member able to co-operate with the other frame to limit the distance of longitudinal displacement of the main frame towards the auxiliary frame and to define a stop position that allows the two frames to be assembled and affixed using the mechanism of connection.

19 Claims, 11 Drawing Sheets

U.S. PATENT DOCUMENTS

| | | | | |
|---|---|---|---|---|
| 3,324,637 A | * | 6/1967 | Windsor et al. | 56/15.6 |
| 3,403,802 A | * | 10/1968 | Lundell | 414/715 |
| 3,425,194 A | * | 2/1969 | Frushour | 56/14.9 |
| 3,599,402 A | * | 8/1971 | Heising et al. | 56/472 |
| 3,645,074 A | | 2/1972 | Shindelar et al. | |
| 3,841,429 A | * | 10/1974 | Falcone et al. | 180/327 |
| 4,057,265 A | * | 11/1977 | Grace | 280/468 |
| 4,150,525 A | * | 4/1979 | De Busscher et al. | 56/14.6 |
| 4,164,985 A | * | 8/1979 | Bobard | 180/53.1 |
| 4,683,969 A | * | 8/1987 | Littau | 180/6.48 |
| 5,029,436 A | * | 7/1991 | Fredriksen et al. | 56/14.5 |
| 5,092,422 A | * | 3/1992 | Hood et al. | 188/329 |
| 6,634,162 B1 | * | 10/2003 | Andros | 56/328.1 |
| 6,875,103 B2 | * | 4/2005 | Matousek et al. | 460/150 |
| 7,175,520 B2 | * | 2/2007 | Matousek et al. | 460/150 |

FOREIGN PATENT DOCUMENTS

| | | |
|---|---|---|
| DE | 21 21 495 A | 11/1972 |
| DE | 34 18 721 A | 11/1985 |
| FR | 2 554 668 A | 5/1985 |
| GB | 2131264 A * | 6/1984 |

* cited by examiner

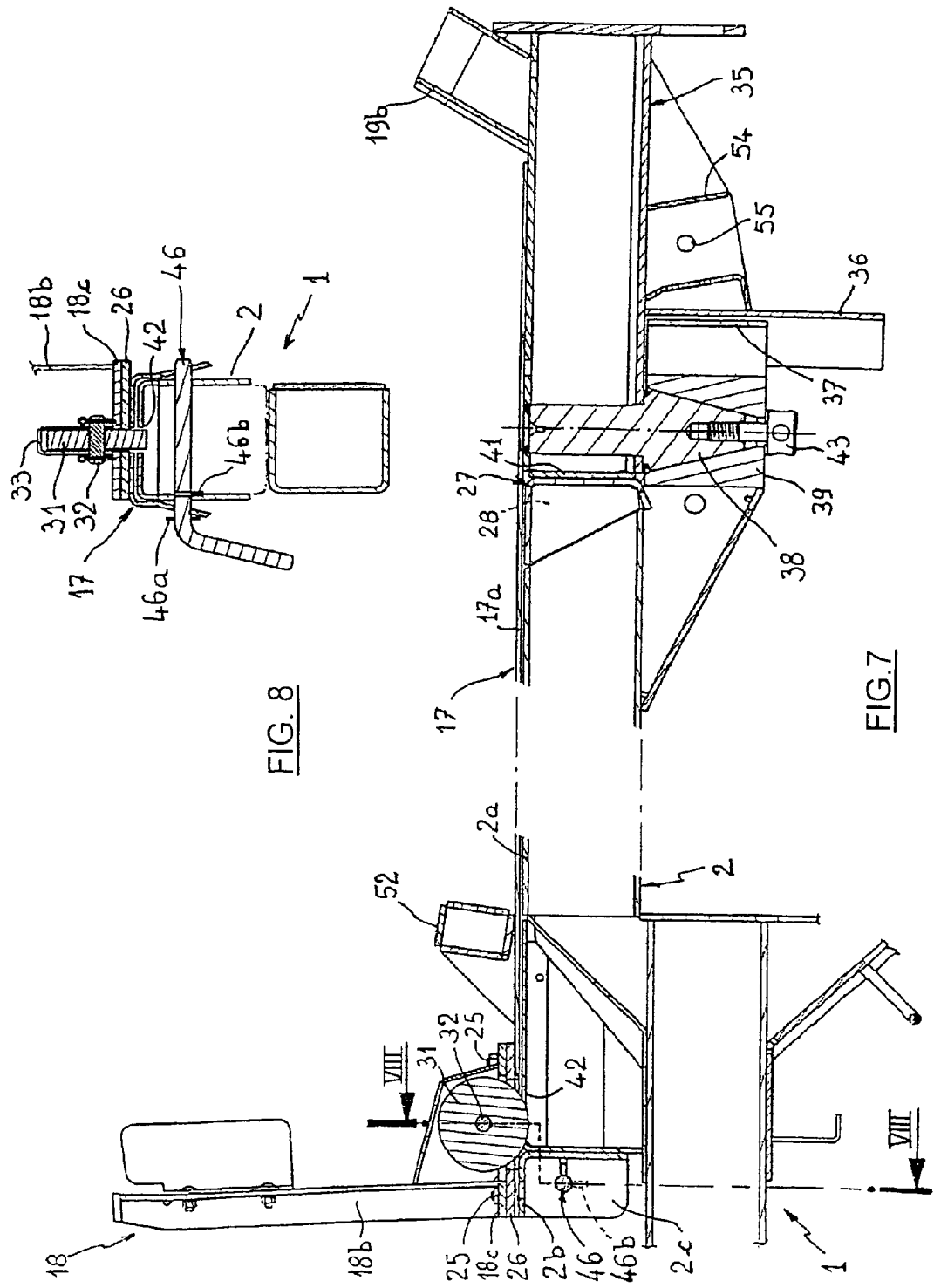

MECHANISM FOR MOUNTING AGRICULTURAL EQUIPMENT TO A MULTI-PURPOSE SELF-PROPELLED STRADDLE CARRIER

CROSS-REFERENCE TO RELATED PATENT APPLICATIONS

This Patent Application claims priority under 35 U.S.C. 371 to P.C.T. International Application Number PCT/EP2004/050301, which was filed on Mar. 12, 2004, and which has Convention Priority based on French Application FR 03.03090 filed Mar. 13, 2003.

FIELD OF THE INVENTION

The present invention relates to a mechanism and a method for mounting agricultural equipment to a self-propelled multi-purpose straddle carrier. Such equipment may be of the type used for the cultivation, treatment and harvesting of fruit-bearing shrubs planted in rows. The straddle carrier comprises a main frame, provided with ground-engaging wheels and lifting mechanism between the wheels and the main frame for raising and lowering said main frame with respect to the ground. The agricultural equipment comprises an auxiliary frame, suitable for detachable connection to the main frame by detachable connecting mechanism. The mounting mechanism comprise the auxiliary and main frames on the one hand, and a plurality of struts for sustaining the main frame on the ground when the auxiliary frame is separated from the main frame, on the other hand. Both the main frame and the auxiliary frames comprise two parallel and substantially horizontal beams or girders.

The present invention may be used in straddle carriers intended particularly, but not exclusively, for the cultivation, treatment and harvesting of grapes. In this document, the invention will be described with respect to such use, it being understood that it is also applicable to machines used in the cultivation, treatment and harvesting of other fruit-bearing shrubs such as raspberry, gooseberry, blackcurrant, olive bushes, etc.

BACKGROUND OF THE INVENTION

Grape harvesters comprising a multi-purpose self-propelled straddle carrier and mounting mechanism of the type defined in the preamble are well known in the art (e.g., from FR-A-2 536 949 and FR-A-2 554 668).

The machines described in the two documents above have greatly simplified the process of exchanging equipment in these machines, for example, in the replacement of grape-harvesting equipment with vine treatment equipment (e.g., for spraying, pruning, etc.) or vice versa, as the inventions described in these documents have removed the need for heavy hoist equipment such as travelling cranes, gantries and/or equipment exchange pits. However, these machines have the inconvenience that a relatively long period of time is required for changing the equipment. In fact, the process of aligning and docking the main frame of the self-propelled straddle carrier relative to the auxiliary frame that carries the new equipment to be installed on the machine in replacement of the removed equipment, is time-consuming, requiring considerable attention and often compelling the driver of the machine to recommence the manoeuvre several times over before the two frames are brought into relative positions that allow them to be coupled and affixed to each other by detachable connection mechanism. For instance, the time required to carry out the approach, alignment, docking and coupling procedure is frequently one hour or longer.

Hence, the object of the present invention is therefore essentially to provide mounting mechanism, of the type defined in the preamble, which allow rapid coupling and uncoupling of the two main and auxiliary frames in relation to each other.

According to one aspect of the present invention, there are provided mechanism for mounting equipment intended for installation on a multi-purpose self-propelled straddle carrier for the cultivation, treatment and harvesting of fruit-bearing shrubs planted in rows, said mounting mechanism comprising:

on the straddle carrier, a main frame mounted on ground-engaging wheels with lifting devices between the wheels and the main frame for selective lifting and lowering of the main frame with respect to the ground;

on the equipment an auxiliary frame suitable for connection to the main frame using detachable connection mechanism;

a number of elongate supports for supporting the auxiliary frame on the ground when the auxiliary frame is separated from the main frame, the main frame and the auxiliary frame both including two parallel and substantially horizontal girders, characterised in that said mounting mechanism further comprise:

on one of the main or auxiliary frames, longitudinal guidance mechanism, operable to co-operate with the two girders on the other frame for guiding the two frames with respect to each other when the main frame moves longitudinally in relation to the auxiliary frame while being supported by the elongate supports; and a stop member on at least one of the frames, able to co-operate with the other frame for limiting the longitudinal path of travel of the main frame along the auxiliary frame and to define a stop position that allows the two frames to be assembled and affixed using said connection mechanism.

Advantageously, the mounting mechanism may comprise one or more of the following features:

two elongate front supports and two elongate rear supports are provided, with lengths and/or connection points for the auxiliary frame, so that the two girders on the auxiliary frame are inclined at an angle of about 4 to 5° to the horizontal, when the supports are sustaining the auxiliary frame;

the two girders of one of the two frames have a predetermined spacing and comprise two caisson profiles, and the two girders of the other frame have the same spacing and each have a structure forming a channel suitable for receiving one of the two caisson profiles and forming mechanism for guiding in a longitudinal direction;

the two caisson girders belong to the main frame and have a rectangular cross-section, and the two girders on the auxiliary frame have, at least for a substantial part of their length, a profiled structure with a cross-section in the form of an inverted U;

the auxiliary frame comprises, at the front end of each profiled structure, an anti-friction device suitable for engaging the upper surface of the corresponding caisson girder on the main frame that is received into the profiled structure;

said anti-friction device may include a roller mounted for rotation about an axis located above one of the upper surfaces of the profiled structure and partly protruding into the interior of the channel in the profiled structure via an opening or a cavity provided in the upper surface of said profiled structure;

the upper surface of each caisson girder on the main frame comprises a cavity or aperture suitable for receiving the lower part of the roller when the main frame is in the stop position defined by stop mechanism;

each of the two girders on the main frame, and each of the two girders on the auxiliary frame, are provided with, adjacent their rear end, one a male part in the shape of a truncated cone, and the other a female part having a cavity in the shape of a truncated cone. The two male parts and the two female parts are suitable for fitting into each other through relative vertical displacement of the main frame with respect to the auxiliary frame when the main frame is in the stop position defined by the stop mechanism;

the female parts each have a smooth axial hole at the bottom of the truncated cone-shaped cavity, the male parts each have a threaded axial hole, and the detachable connections mechanism comprise two screws or bolts that can be inserted through the smooth holes in the female cavities and screwed into the threaded holes in the male parts;

each of the caisson girders in the main frame has at its rear end a corner-shaped structure with lateral faces converging both backwards and upwards;

each of the two female parts is fixed at the rear end of the corresponding caisson girder in a position off-set backwardly and upwardly with respect to the corner-shaped structure, and the stop mechanism comprise on the one hand a first pair of vertical plates bent into a V, which are affixed to the female parts behind them, and on the other hand a second pair of vertical plates bent into a V and affixed to the inverted U-profile structures on the auxiliary frame, extending downwardly from said profile structures behind the male parts, and having a vertical dimension approximately twice the dimension of these male parts;

each of the two profiled structures in the form of an inverted U on the auxiliary frame has lateral wings at the front end, diverging both forwardly and downwardly;

each of the two profiled structures in the form of an inverted U on the auxiliary frame has at least one lateral wing with a vertical dimension that increases from the front to the back of the auxiliary frame;

in the rear section of the auxiliary frame, at least one of the two lateral wings of each of the two profiled structures in the form of an inverted U has a lower part that diverges laterally and downwardly, away from the other lateral wing;

the detachable connection mechanism comprise two locking pins, each of these locking pins being inserted through holes with horizontal axes, which are provided in each girder of the auxiliary frame and in each corresponding girder of the main frame and which are aligned only when the lower part of said roller is engaged within said cavity.

According to another aspect of the present invention there is provided a method for the mounting of equipment selected from a variety of various items onto a multi-purpose self-propelled straddle carrier for the cultivation, treatment and harvesting of fruit-bearing shrubs planted in rows, said self-propelled straddle carrier comprising a main frame suitable for lifting and is lowering and comprising a first pair of parallel and spaced girders, the equipment being supported by elongate supports when in a state of waiting prior to installation on the self-propelled straddle carrier, and comprising an auxiliary frame suitable for connection to the main frame by detachable connection mechanism and comprising a second pair of girders, said method being characterised in that it comprises:

a) using, for one of the first and second pairs of girders, two girders having each a structure that forms a channel suitable for receiving and guiding one of the girders of the other pair of girders during longitudinal displacement of the main frame with respect to the auxiliary frame supported by the elongate supports;

b) moving the self-propelled straddle carrier to a position so that each of the girders of the first pair is aligned in substantially the same vertical plane as a corresponding girder from the second pair, and the end of each of the girders of the first pair is at a level lower than the first end of the corresponding girder of the second pair of girders;

c) raising the main frame over a distance sufficient to make the respective ends of the first and second pairs of girders engage, the one within the other;

d) moving the main frame longitudinally with respect to the auxiliary frame to a position defined by the mutual engagement of stop members;

e) raising the main frame further such that the first pair of girders carries the second pair of girders, the auxiliary frame and the equipment borne by that frame, and eliminating the load from the weight of the auxiliary frame and the equipment unloading on the elongate supports;

f) affixing the auxiliary frame to the main frame using the detachable connection mechanism;

g) removing the elongate supports; and h) lowering the main frame to bring the carrier to the required level for road transport or for operation of the installed equipment.

The method may also comprise one or more of the following features:

it also involves the use of elongate supports or struts with lengths and/or points of attachment to the auxiliary frame, such that the two girders in the auxiliary frame are inclined upwards from one end to the other at an angle of 4-5° to the horizontal when the auxiliary frame is supported by said supports, and step (e) in the lifting process includes pivoting the two girders of the auxiliary frame around a virtual pivot axis defined by the points of contact between the first extremities of the two girders in the auxiliary frame and the two girders of the main frame;

this pivoting step includes a positioning step during which male and female conical parts affixed to the girders couple together automatically in order to ensure precise positioning of the other extremities of the girders in the auxiliary frame with respect to the girders of the main frame;

in step (d), an anti-friction device is used between the main frame and auxiliary frame

BRIEF DESCRIPTION OF THE DRAWINGS

Other features and advantages of the invention will become apparent from the following description of an embodiment of the invention, by way of example, with reference to the accompanying drawings, in which:

FIG. 7 is a vertical longitudinal section showing the girders in FIGS. 4 and 5 coupled together;

FIG. 8 is a cross-sectional view, along the line VIII-VIII in FIG. 7;

DETAILED DESCRIPTION OF THE PREFERRED EMBODIMENTS

Figure 1:
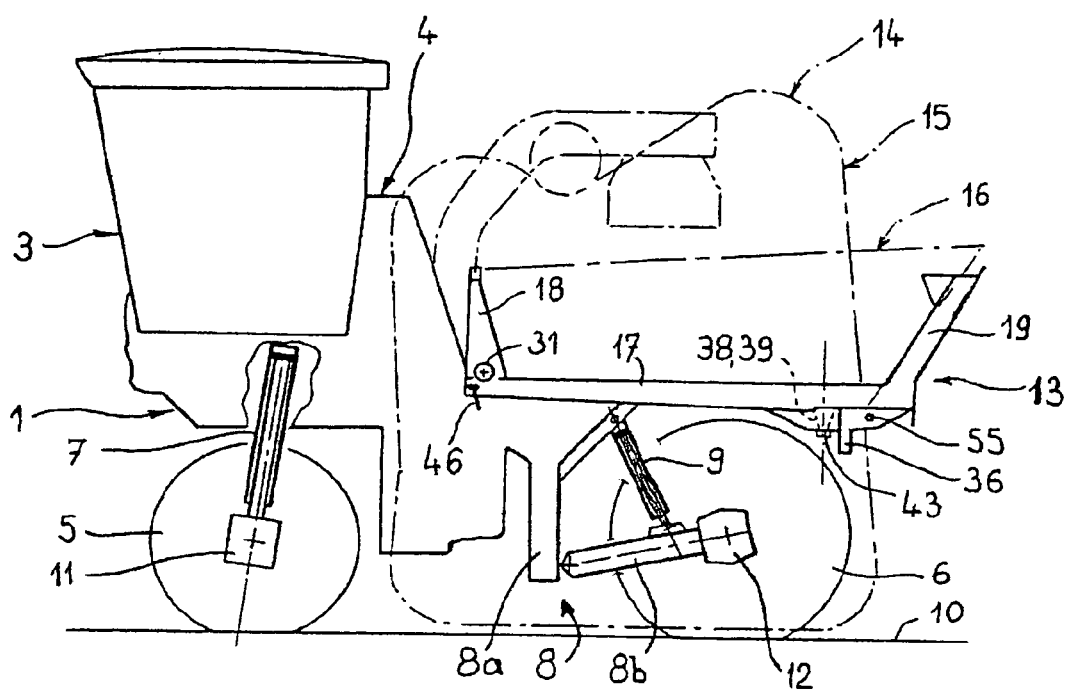
FIG. 1 shows a schematic, lateral elevation view of a self-propelled multi-purpose straddle carrier, with some parts removed, comprising mounting mechanism according to the invention, with grape-harvesting equipment shown only in phantom outlines.

Referring first to FIG. 1, there is shown a self-propelled multi-purpose straddle carrier comprising a main frame 1, consisting essentially of two parallel and substantially horizontal girders 2 (not visible in FIG. 1, but at least one of them is clearly visible in FIGS. 2, 4, 7, 10, 11, 12, 13, 14 and 15). The girders 2 are bridged at their front section by at least one cross-piece, which together with the girders 2 forms a rigid carrying frame for supporting a driver's cab 3 and an power unit 4 such as a diesel engine, suitable for driving the hydraulic pumps and the electrical generator, producing the hydraulic and electrical energy necessary for operating the various electrical and hydraulic units on the self-propelled straddle carrier and the equipment mounted thereto.

The main frame 1 is mounted on four ground-engaging wheels, i.e., two front driving wheels 5 and two rear wheels 6 (only one front wheel and one rear wheel are visible in FIG. 1).

Each front wheel 5 is supported by a mechanism 7, which constitutes both a lifting device and a steering device and has, for example, a structure such as that described in FR-A-2 551 014.

Each rear wheel 6 is supported by an articulated arm 8, comprising a stationary vertical part 8a fixed rigidly to one of the two girders 2 of the main frame 1 and extending downwards from the girder, and a pivotable part 8b connected via a horizontal pivot axis to the lower end of part 8a and extending almost horizontally therefrom to the rear of the carrier. The wheel 6 is mounted in the rear end of the section 8b of the arm 8.

A hydraulic cylinder 9 is mounted substantially vertically between the part 8b of each arm 8 and the main frame 1, for pivoting part 8b of the arm 8 and of the corresponding wheel in a vertical plane when the cylinder is actuated. Accordingly, when activated selectively, the two hydraulic cylinders 9 and the two hydraulic cylinders provided within the lifting and steering devices 7 of the two front wheels 5, allow the main frame 1 to be raised and lowered with respect to the ground 10.

It is well known that the above-mentioned cylinders can also be used as inclination compensation mechanism, when the self-propelled straddle carrier moves along a slope. It is also well known that at least two of the four wheels 5 and 6, and preferably all four wheels 5 and 6, are driving wheels, as rotative hydraulic motors 11 and 12 are incorporated into the hubs of these wheels.

The main frame 1 carries a detachable auxiliary frame 13, connected to the main frame by detachable connection mechanism described in greater detail below. The auxiliary frame 13 itself supports an equipment 14, mainly comprising in the example shown in FIG. 1 a harvesting unit 15 and at least one bin or hopper 16, and preferably two tipper bins located on either side of the harvesting unit 15 for temporary storage of the grape bunches or grape berries harvested. In FIG. 1, the equipment 14 is shown only in phantom outlines, as it is well-known equipment and its detailed description is therefore not necessary for a good understanding of the present invention.

Figure 2:
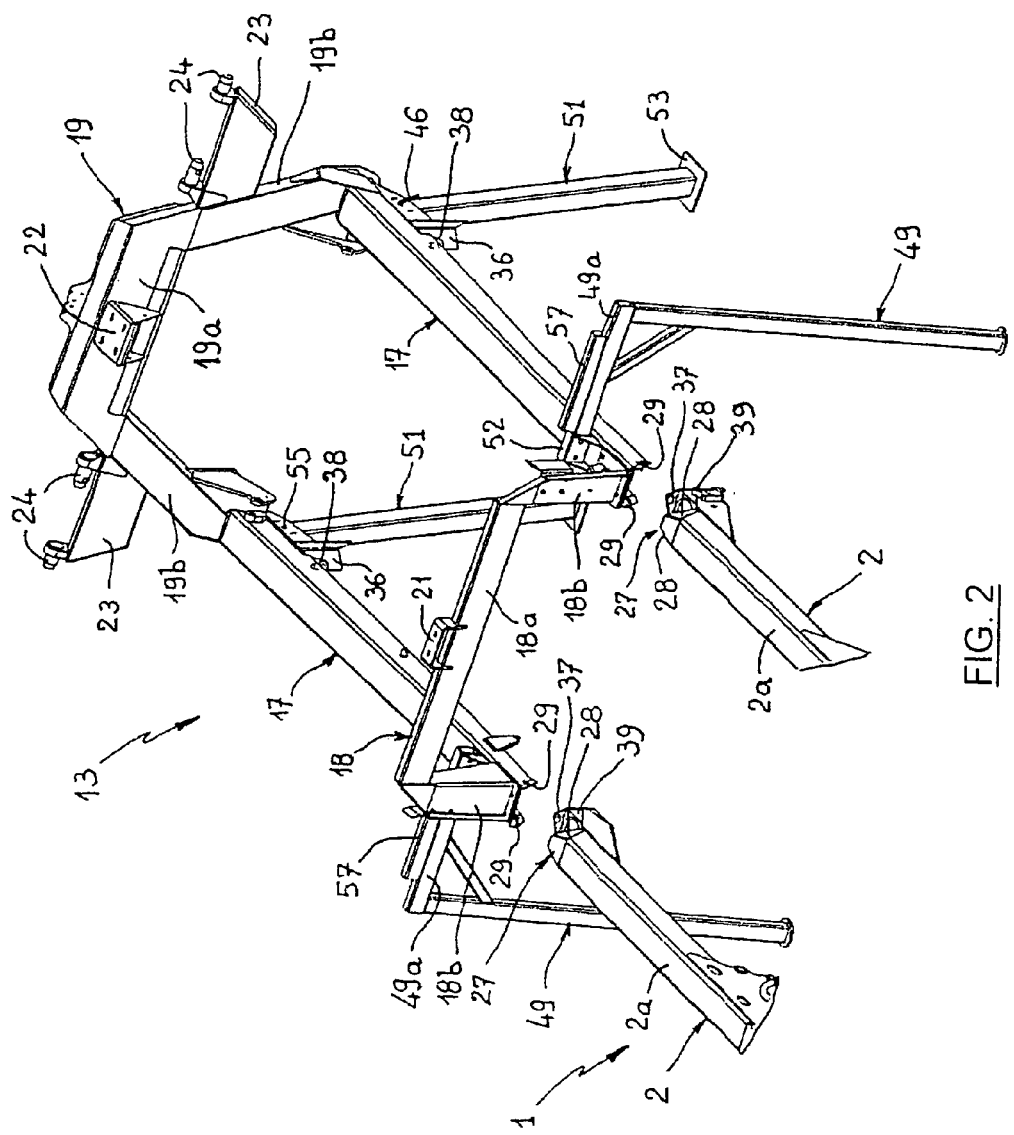
FIG. 2 is a perspective view showing a rear part of the main frame of the straddle carrier, detached and separated from an auxiliary frame for the grape-harvesting equipment which stands on the ground, supported by four struts.
Figure 3:
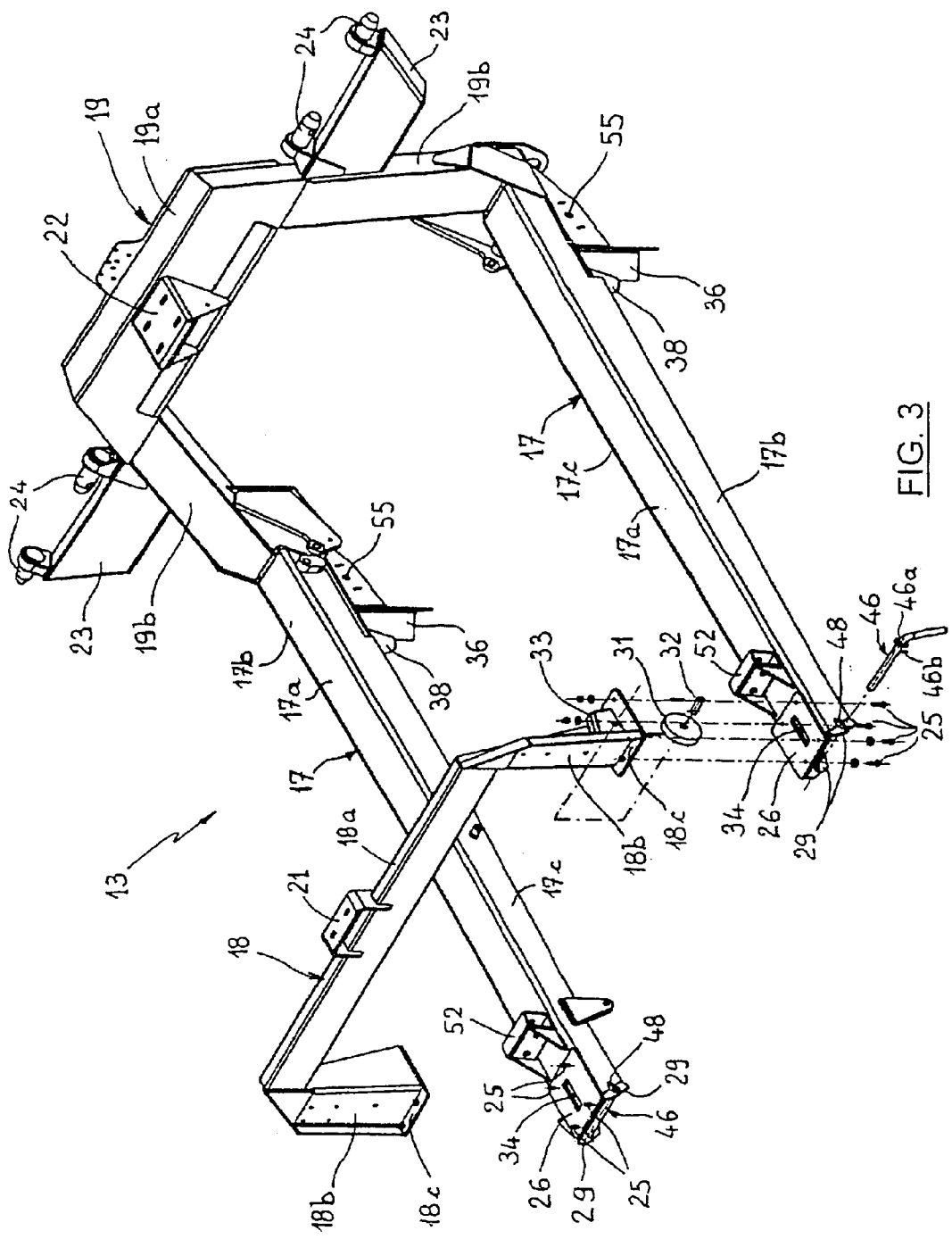
FIG. 3 is an exploded perspective view showing the auxiliary frame for the grape-harvesting equipment shown in FIG. 2, on a larger scale.

Referring now to FIGS. 2 and 3, one can see that the auxiliary frame 13 comprises essentially two parallel, substantially horizontal beams or girders 17, bridged at their front ends by a front crossbar 18 and at their rear ends by a rear crossbar 19. The spacing of the two girders of the auxiliary frame 13 corresponds to the spacing of the two girders 2 of the main frame 1.

Each girder 17 of the auxiliary frame 13 has, at least along a substantial part of its length, a profiled structure in the form of an inverted U, dimensioned for receiving one of the two girders 2 of the main frame 1 by sliding, in a manner described in further detail below. Each girder 2 consists, for example, of a caisson girder having rectangular or square section.

Each of the two crossbars 18 and 19 of the auxiliary frame 13 includes an upper horizontal crosspiece 18a or 19a and two legs 18b or 19b. Substantially in the middle of each of the two crosspieces 18a and 19a, a support mount 21 or 22 (respectively) is fixed for a front or rear support assembly (not shown), which allows the known mounting of a harvesting unit 15 in a hanging position.

Each of the two legs 19b of the rear crossbar 19 is provided with a support 23, which in turn supports two journals 24 used as a pivot for one of the two tipper bins 16. The two legs 19b of the rear crossbar 19 are for example welded to the rear extremities of the two girders 17 of the auxiliary frame 13, such that the two girders 17 and the rear crossbar 19 form a unitary weld assembly.

The front crossbar 18 constitutes another weld assembly, comprising at the lower end of each of its legs 18b a base plate 18c which can be bolted, for example by four bolts 25, to a support plate 26, which is welded to the upper surface 17a of the corresponding girder 17 in the front section thereof, as shown in FIG. 3.

Each of the two girders 2 of the main frame 1 extends rearwardly beyond the articulated arms 8, and its free rear end can be inserted into the front end of the channel formed by the inverted U profiled structure of the corresponding girder 17 of the auxiliary frame 13. It then slides longitudinally into the interior of said channel, being guided by the lateral walls of the channel. In order to facilitate introduction of the free rear end of each girder 2 into the channel of the inverted U profiled structure of the corresponding girder 17, the caisson girder in each girder 2 is ending at its free rear extremity in a corner-shaped structure 27 with lateral faces 28 converging backwards and upwards. For the same purpose, each of the two inverted U profiled structures constituting the girders 17 of the auxiliary frame 13 has at its front section two lateral wings, which diverge both forwardly and downwardly, thus forming an entry convergence for the corner-shaped structure 27 at the rear end of the corresponding girder 2 of the main frame 1.

In order to facilitate the movement of the girders 2 into the channels defined by the respective inverted U profiled structures in the girders 17 of the auxiliary frame 13, the auxiliary frame comprises, adjacent the front end of each girder 17, an anti-friction device suitable for contacting the upper surface 2*a* of the caisson girder constituting the corresponding girder 2 of the main frame 1.

In particular, as shown in FIGS. 3, 5, 7 and 8, each anti-friction device may consist of a roller 31 mounted for rotation about an axle 32 and having ends supported by the vertical walls of a casing or support housing 33. Each housing 33 is fixed, for example by welding, to the base-plate 18*c* of the two corresponding legs 18*b* of the front crossbar 18. Each roller 31 partly protrudes into the interior of the inverted U profiled structure of the corresponding girder 17 via slot-shaped openings, which are generally designated by reference 34 in FIGS. 3 and 5 and which are provided and vertically aligned in the base-plate 18*c*, the support plate 26 and the upper surface 17*a* of the corresponding profiled girder 17.

Figures 5, 6:
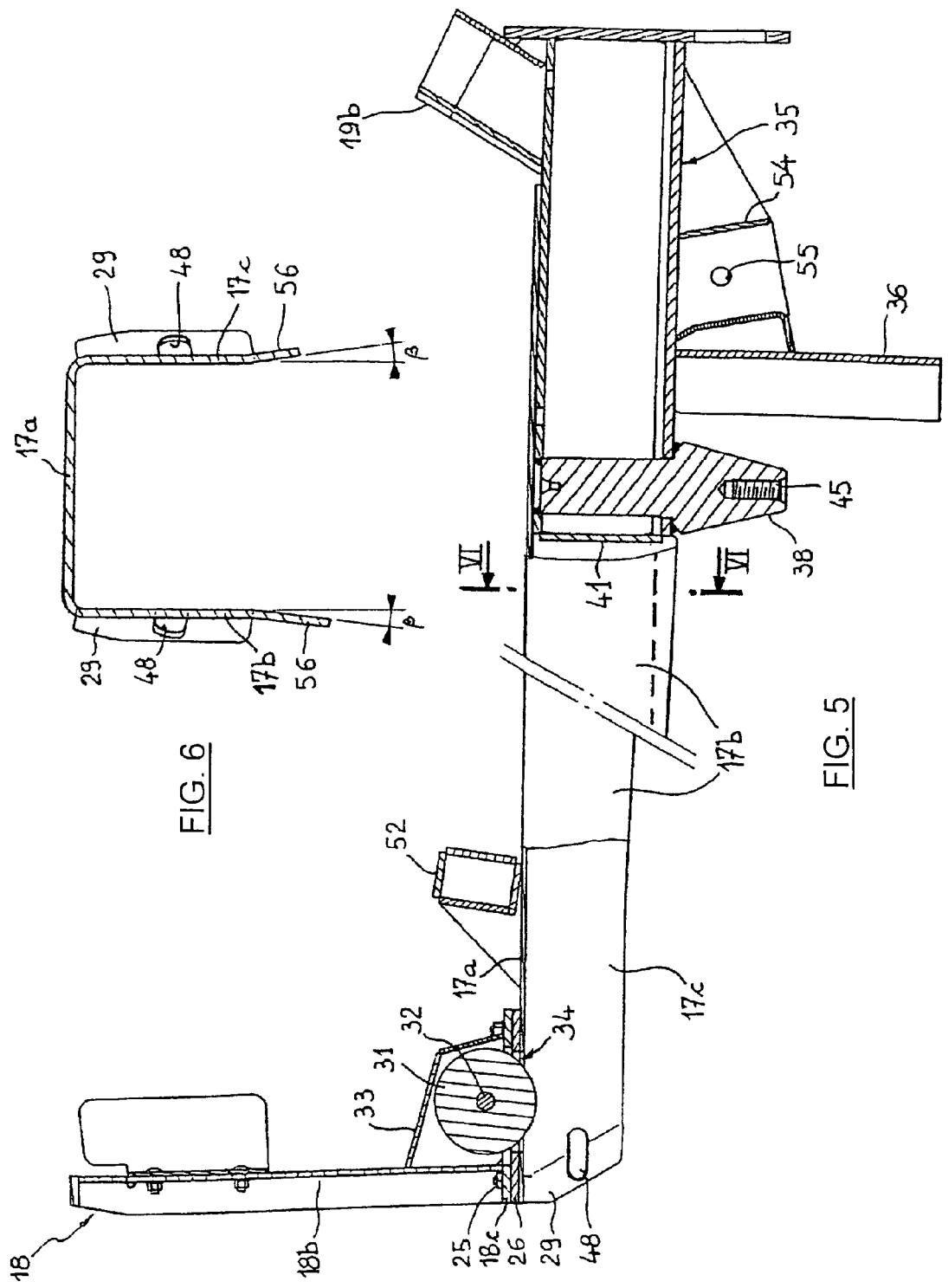
FIG. 5 is a view of a girder of the auxiliary frame, partly in lateral elevation and partly in longitudinal vertical section.
FIG. 6 is a cross-sectional view of the girder of FIG. 5, taken along the line VI-VI.

In the area adjacent its rear end, the inverted U profiled structure making up each girder 17 is strengthened by a caisson reinforcement structure clearly shown in FIGS. 5 and 7. Each reinforcement structure 35 has a stop 36 attached thereto for co-operation with another stop 37 provided in the rear area of each of the two caisson profiles making up the girders 2 of the main frame 1, in order to define a stop position limiting the longitudinal displacement of the main frame 1 with respect to the auxiliary frame 3, when the girders 2 are introduced and slid longitudinally in the channel of the inverted U profiled structure within the two girders 17 of the auxiliary frame 13. The stops 36 and 37 also have a centering function, as shown below.

Each of the two girders 2 in the main frame 1, and each of the two girders 17 in the auxiliary frame 13, comprise the following structure adjacent their rear ends: one girder a male, truncated cone part 38, the other a female truncated cone part 39 with a truncated cone receptacle 39*a* of a shape complementary to the male part 38, allowing that part to fit tightly into the female part 39.

In the example shown, each of the two female parts 39 is attached to the rear end of the caisson girder of the corresponding girder 2 of the main frame 1, so that it is offset backwards and downwards with respect to the corner-shaped structure 27, the geometric axis of the truncated cone receptacle 39*a* of the female part 39 being orientated substantially vertically. Each male truncated cone part 38 is fixed rigidly to the reinforcing structure 35 of the inverted U profiled structure of the corresponding girder 17, in immediate proximity to the wall of the front end 41 of the reinforcing structure 35, so that the male truncated cone part 38 extends substantially vertically downwards from the reinforcing structure 35 and below it, and the upper end of the foremost generator line of said male truncated cone part 38 is aligned substantially vertically to the wall of the front end 41, as shown in FIG. 5.

Figure 4:
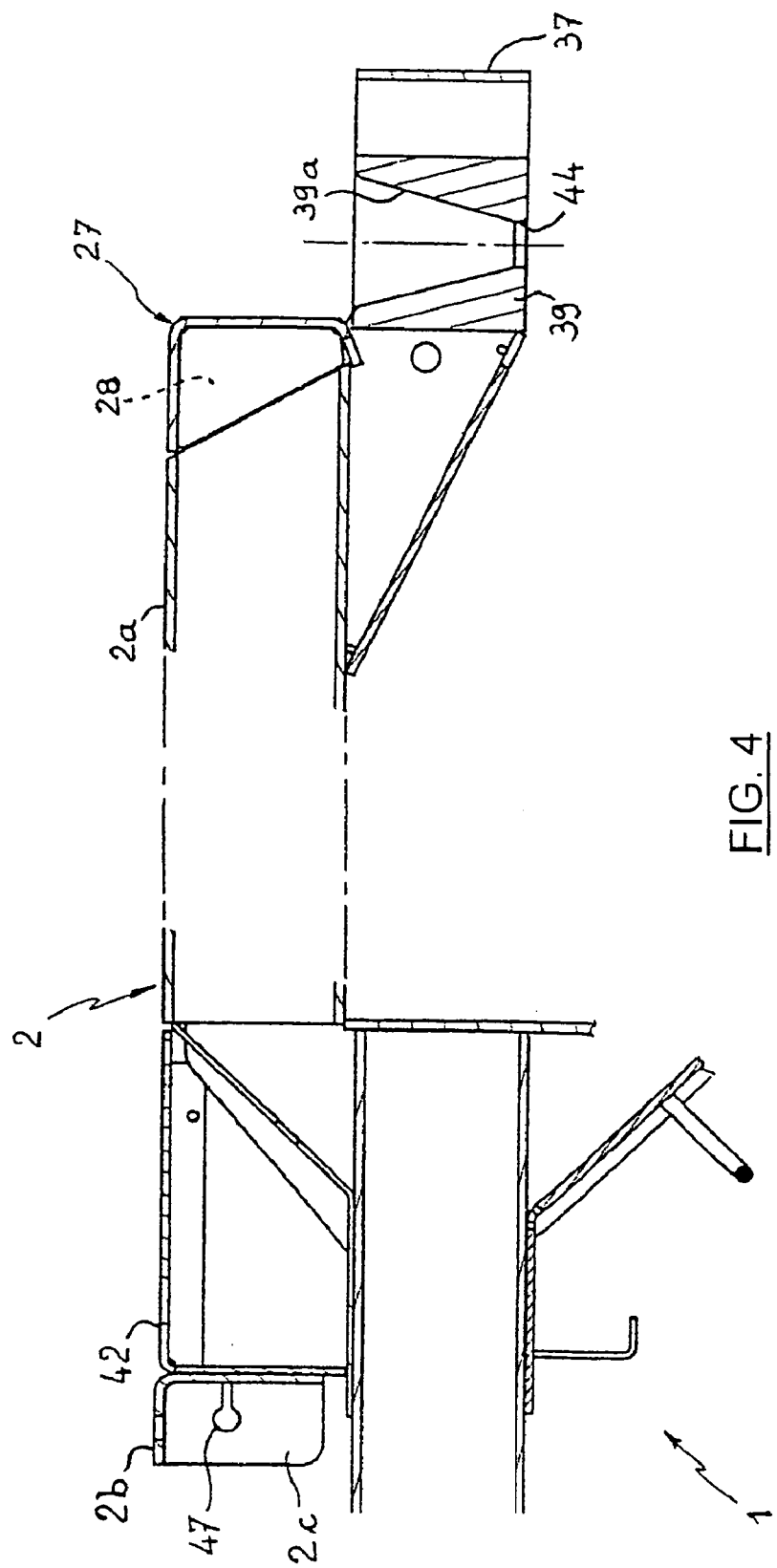
FIG. 4 is a longitudinal section view of a girder forming part of the main frame of the self-propelled multi-purpose straddle carrier.

Preferably, the two stops 37 may consist of vertical sheet metal plates bent into a V and fixed respectively, for example by welding, behind the female parts 39, as can be seen in FIGS. 2 and 4. Under these circumstances, the two stops 36 may also consist of two vertical sheet metal plates bent into a V and fixed respectively, for example by welding, to the reinforcement structures 35 on the inverted U profiled structures of each of the two girders 17, so that they extend downwards behind the male truncated cone parts 38, at such a distance therefrom that, when the main frame 1 is in the above-mentioned stop position defined by the stops 36 and 37, each male truncated cone part 38 can fit firmly into the corresponding female part 39 through upward vertical displacement of the main frame 1 in relation to the auxiliary frame 13.

Preferably, the upper surface 2*a* of the caisson girder constituting the girder 2 in the main frame 1 should, in the area of its front end, have an opening or cavity 42 as can be seen in FIG. 4. Each opening or cavity 42 is foreseen for receiving a lower part of one of the two rollers 31 when the main frame 1 is in the stop position defined by the stop members 36 and 37, as shown in FIGS. 7 and 8. Under these circumstances, the upper surface 17*a* of each inverted U profiled structure girder 17 on the auxiliary frame 13 rests on a support piece 2*b* fixed to the front end of the corresponding girder 2 so that a narrow gap is left between the walls 2*a* and 17*a* of the girders 2 and 17.

When the main frame 1 and auxiliary frame 13 are in the assembled position, as shown in FIG. 7, they may be affixed to each other in a detachable manner, using connection mechanism comprising two screws or bolts 43, which pass respectively into smooth holes 44 located at the lower end of the female parts 39 and which are screwed into the respective threaded holes 45 in the male truncated cone parts as shown in FIG. 7.

The detachable connection mechanism may further comprise two locking pins 46. Each locking pin 46 may be inserted through holes with horizontal axes 47 in the lateral wings 2*c* of the support piece 2*b* attached to each girder 2 of the main frame 1, and into holes with horizontal axes 48 in each girder 17 of the main frame 13, adjacent the front end of each of the girders 17. The holes 47 and 48 are aligned only when the main frame 1 is in the end position defined by the stops 36 and 37 and when the lower part of the rollers 31 is received in the opening 42 in each of the two main frame girders 2. Preferably, the holes 48 should have an oblong shape as shown in FIG. 5.

A holding device should preferably be provided for preventing the locking pins 46 from slipping out of the holes 47 and 48.

To this end, at least one of the two holes 47 in each girder 2 takes the form of a key-hole (FIG. 4) and each pin 46 comprises a stop collar 46*a* suitable for contacting the exterior of one of the lateral wings in the inverted U profiled structure of the corresponding girder 17, and a rod 46*b* which, once the pin 46 is fully engaged in the holes 47 and 48 and has rotated through 90°, latches onto the interior of the wing of the inverted U profiled structure 17, thereby preventing the pin 46 from coming out, as shown in FIGS. 7 and 8.

Figure 11:
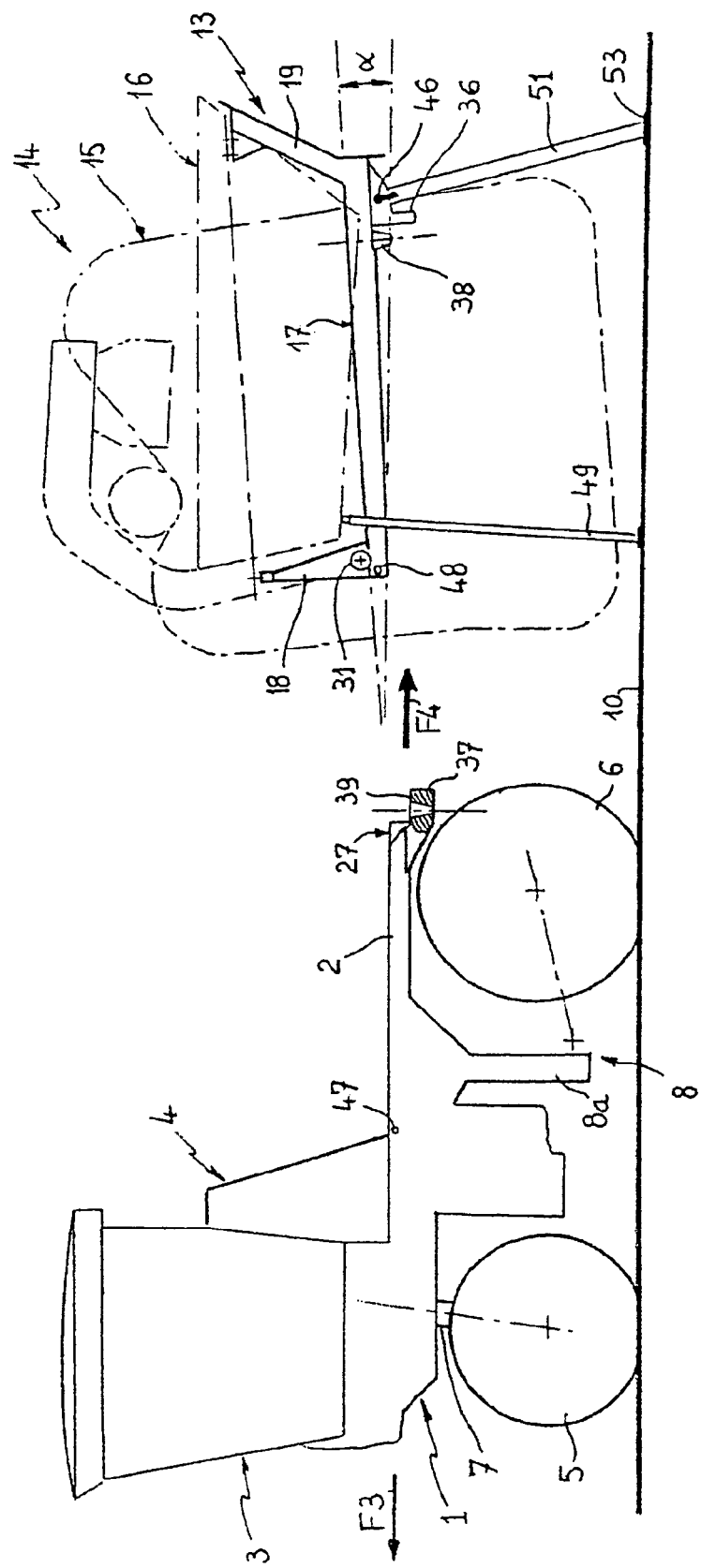

Four elongate supports, that is two front struts 49 and two rear struts 51, are provided for supporting the auxiliary frame 13 and the harvesting equipment 14 when the auxiliary frame 13 is separated from the main frame 1 of the self-propelled straddle carrier, as can be seen particularly in FIGS. 2 and 11. Each of the front struts 49, by way of example, may have the shape of an inverted L and consists of tubular profiles with rectangular sections and fixed to each other, for example by welding. Two sleeves 52, also with rectangular sections, are fixed respectively to the girders 17 of the auxiliary frame 13, close to the base of the front crossbar 18. Each sleeve 52 is dimensioned such that the free end of the horizontal branch 49*a* of one or another of the front struts 49 can be slidingly received therein.

Each of the two rear struts 51 consists essentially of a tubular profile, provided at its lower end with a base-plate 53. Its upper end can be slid into a socket 54 fixed rigidly, for example by welding, to the reinforcement structure 35 of one or other of the two girders 17 of the auxiliary frame 13.

As can be seen in particular in FIGS. 5 and 6, each socket 54 is attached under the corresponding reinforcement structure 35 such that its upper end is closed by the reinforcement structure 35 and its lower end is open for receiving the upper extremity of the corresponding rear strut 51. The geometric axis of each socket 54 is inclined slightly backwards in relation to the vertical.

Each socket 54 comprises two aligned holes 55, with horizontal axes, aligned with two holes (not shown) in the upper end of each rear strut 51 when this strut is slid to the end of the corresponding socket 54. The holes 55 in the sockets 54, and the corresponding holes in the rear struts 51, are dimensioned so as to receive the locking pins 46. In this way, when the pins 46 are removed from the holes 47 and 48 of the girders 2 and 17, they can also be used to secure the rear struts 51 to the sockets 54 on the girders 17.

Figure 13:
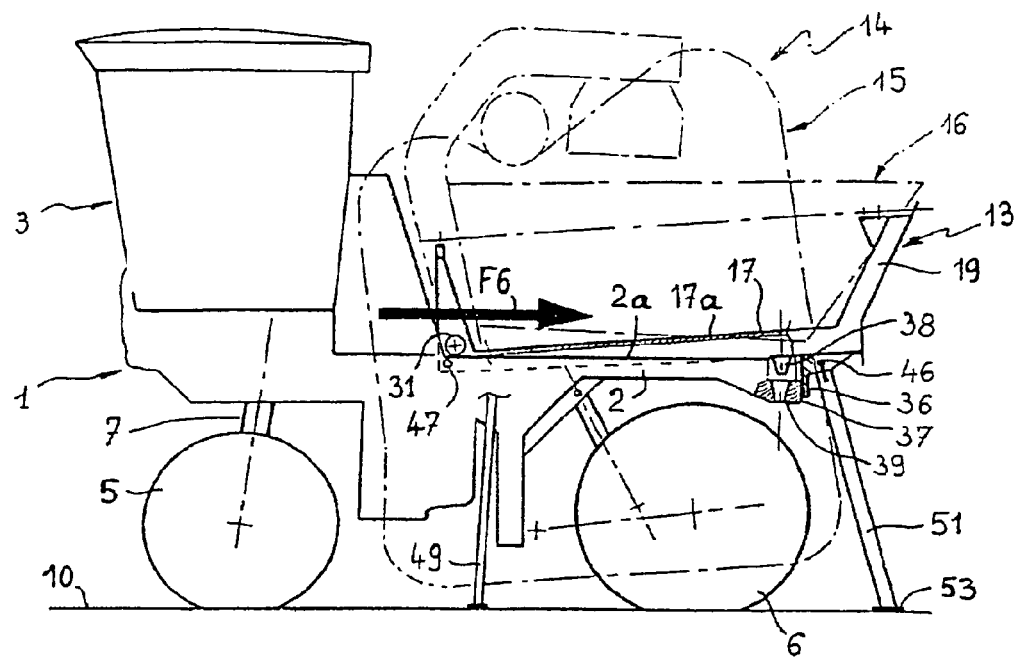

As illustrated in FIG. 11, the rear struts 51 are longer than the front struts 49, such that the two girders 17 on the auxiliary frame 13 are inclined at an angle α to the horizontal when the auxiliary frame 13 is supported by the struts 49 and 51. This angle α is chosen such that, when the auxiliary frame 13 is supported by the struts 49 and 51 and the rollers 31 are just in contact with the upper surface 2a of the girders 2 in the main frame, the upper end of the female parts 39 is taking a position slightly below the lower end of the male truncated cone parts 38. This mechanism that the female parts 39 can pass below the male parts 38 when the main frame 1 is driven backwards below the main frame 13 between the struts 49 and 51, as shown in FIG. 13. For example, the angle α may be about 4-5°.

Figure 12:
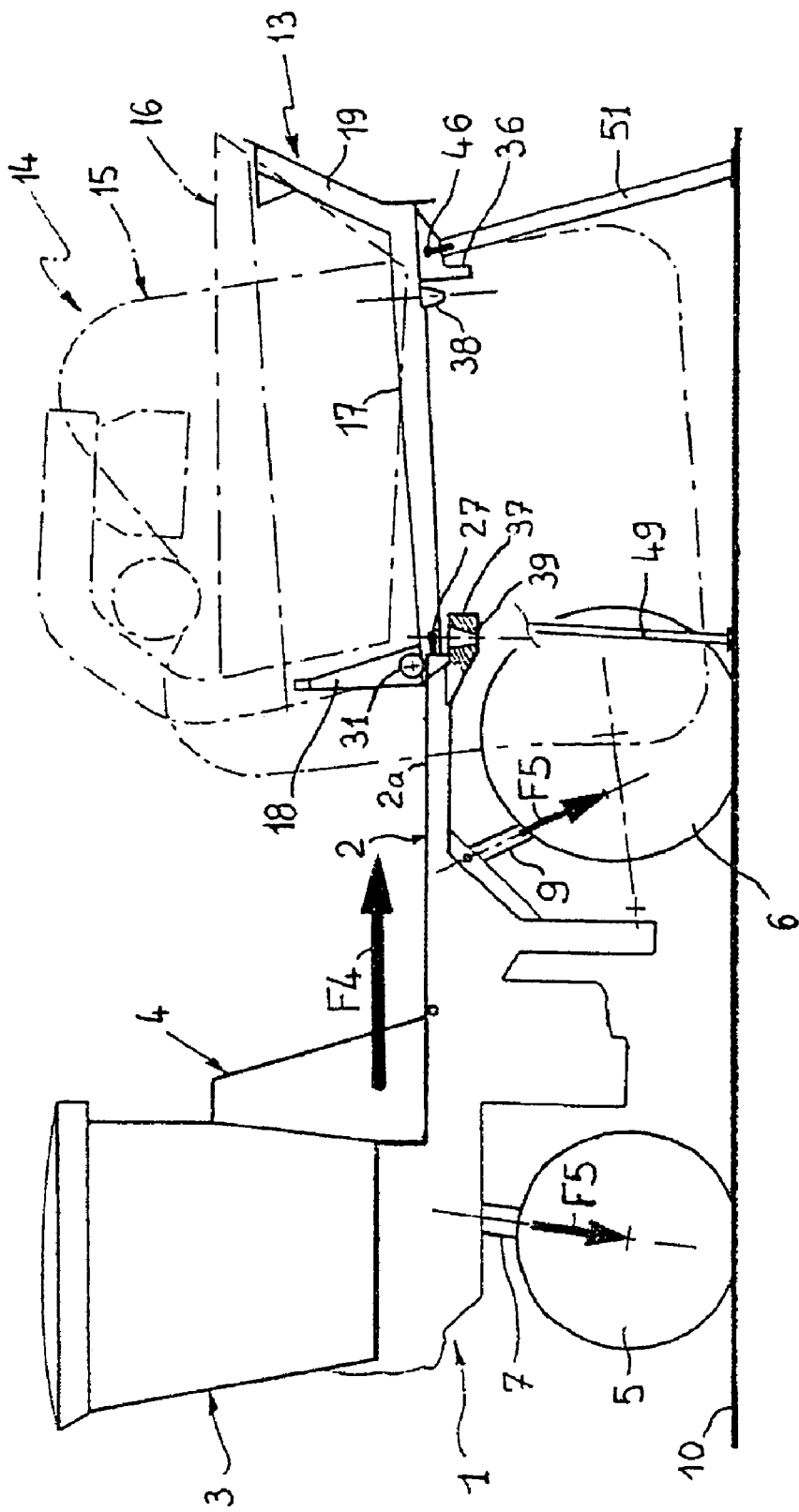
FIGS. 12-14 are schematic diagrams similar to those in FIGS. 1 and 9-11, showing successive steps in the approach, alignment, docking and coupling of the main frame of the self-propelled straddle carrier and the auxiliary frame carrying the grape-harvesting equipment.

In order to ensure guidance of the two girders 2 in the main frame 1 inside the channels of the inverted U profiled structure girders 17 until the stops 36 and 37 contact each other, despite the inclination at an angle of the girders 17 when the auxiliary frame 13 is supported by the struts 49 and 51, at least one of the two lateral wings 17b and 17c on the two inverted U profiled structures has a vertical dimension that increases from the front to the back of the auxiliary frame 13, as is illustrated in FIG. 12. It is not essential for the two wings 17b and 17c to have a vertical dimension that increases from the front to the back of the auxiliary frame 13, or for their vertical dimensions to increase in the same proportion. For example, in the rear region of the auxiliary frame 13, the outer lateral wing 17b may have a greater vertical dimension than the inner lateral wing 17c, as shown in FIG. 6.

In the same manner, in order to guarantee that the stops 36 and 37 contact each other when the main frame 1 is driven backwards under the auxiliary frame 13, even though the girders 17 are inclined at an angle α to the horizontal when the auxiliary frame 13 is supported by the struts 39 and 51, the two vertical plates constituting the stops 36 have a considerably greater vertical dimension, for example, at least twice the vertical dimension of the male truncated cone parts 38, as is illustrated by FIG. 5. It is also clear that the V-shape of the plates constituting the stops 36 and 37, allows the rear parts of the girders 2, 17 to be re-centered or realigned if they were not already aligned when the stops 36 and 37 contacted each other.

In addition, in the rear part of the auxiliary frame 13, at least one of the two lateral wings 17b and 17c in each of the inverted U profiled structures making up the girders 17, e.g., the two lateral wings 17b and 17c shown in FIG. 6, have lower parts 56 that diverge laterally and downwardly away from each other. Each lower part 56 forms an angle β to the vertical. The angle β may be, for example, 5-7°. This also facilitates realignment of the rear parts of the girders 2 and 17 when the main frame 1 of the self-propelled straddle carrier is raised to load the auxiliary frame 13 and the equipment 14 that it carries.

There now follows a description of the operations required to disconnect and remove the auxiliary frame 13 and the harvesting equipment 14 from the main frame 1 of the self-propelled straddle carrier, with reference to FIGS. 1 and 9-11. Starting from the position shown in FIG. 1, the two bins or hoppers 16 are first of all partly raised using the associated hydraulic cylinders. The main frame 1 of the self-propelled straddle carrier is then raised by extending the piston rods of the hydraulic cylinders contained in the lifting and steering devices 7 and the piston rods of the hydraulic cylinders 9, as indicated by arrows F1 in FIG. 9.

Figure 9:
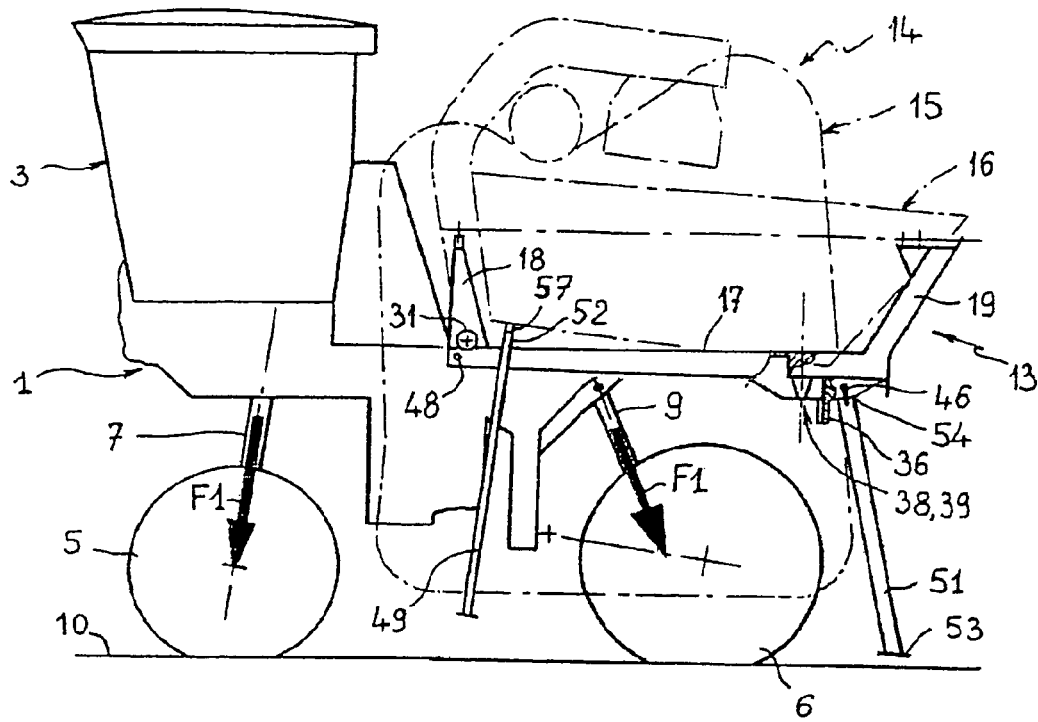
FIGS. 9-11 are schematic diagrams similar to that in FIG. 1, showing successive steps in the process of removal and deposition of the auxiliary frame carrying the grape-harvesting equipment.

Next, the two locking pins 46 are removed from the holes 47 and 48 at the front of the girders 17, and the front struts 49 are positioned in the sleeves 52. The rear struts 51 are then slid into the sockets 54 and locked into position using the two locking pins 46, which are inserted into the holes 55 as shown in FIG. 9.

Next, the hydraulic hoses that connect the self-propelled straddle carrier to the harvesting equipment 14, are removed, with the exception of the hoses to the hydraulic cylinders associated with the two bins 16. Next, the two bolts 43 (FIG. 7) that keep the two male truncated cone parts 38 coupled to the two female parts 39 are unscrewed and removed. After that, the two bins 16 are lowered using the associated hydraulic cylinders until the bins 16 come to rest on the buffers 57 provided on the horizontal branches of the front struts 49, as can be seen also in FIG. 9. Next, the hoses from the hydraulic cylinders associated with the bins 16 are disconnected, as are the electrical wire harnesses.

Figure 10:
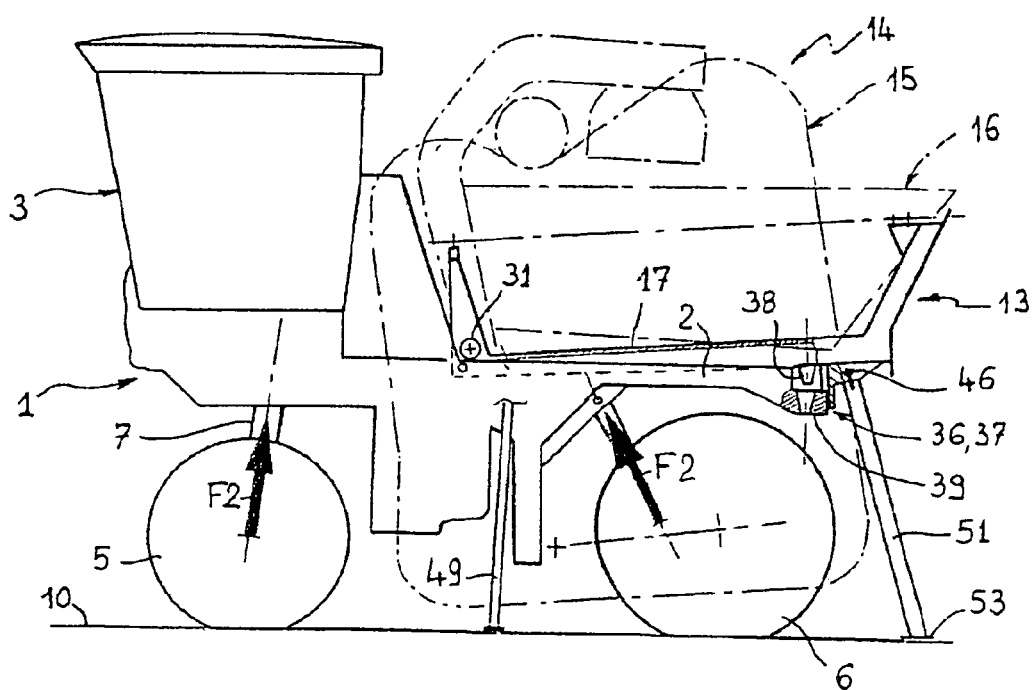

Next, the main frame 1 of the self-propelled straddle carrier is lowered by slowly and completely retracting the piston rods of the hydraulic cylinders 9 and the hydraulic cylinders incorporated in the lifting and steering mechanisms 7, as indicated by the arrows F2 in FIG. 10. During this operation, the base plates 53 of the rear struts 51 are first to rest on the ground 10, whereupon the male and female parts 38 and 39 are separated from each other while the two rollers 31 remain positioned in the openings 42 in the girders 2 before the base plates of the front struts 49 contact the ground 10. When the feet of the front struts have contacted the ground, the rollers 31 leave of the openings 42 and the auxiliary frame 13 bearing the harvesting equipment 14 is then completely disconnected from the main frame 1 of the self-propelled straddle carrier, which can now be moved forward slowly in a straight line as indicated by arrow F3 in FIG. 11. The auxiliary frame 13 and harvesting equipment 14 will thus be left resting on the ground 10 supported by the struts 49 and 51. The self-propelled straddle carrier can then be used for other purposes, as described below.

Tests carried out by the applicant have shown that the total time required to separate the auxiliary equipment 13 and harvesting equipment 14 from the main frame 1 is approximately 15 minutes, including 8-10 minutes for uncoupling the auxiliary frame 13 from the main frame 1 of the self-propelled straddle carrier.

There now follows a description of the operations required to install the auxiliary frame 13 and harvesting equipment 14 on the self-propelled straddle carrier, with reference to FIGS. 11-14. Starting from the position shown in FIG. 11, in which the main frame 1 of the self-propelled straddle carrier is lowered as far as possible, the straddle carrier is driven backwards towards the front end of the auxiliary frame 13, which rests on the ground 10 supported by the struts 49 and 51 and carrying the harvest equipment 14, as shown by the arrow F4 in FIGS. 11 and 12. During this operation, the driver of the straddle carrier has a good view of the rear extremities of the girders 2 of the main frame 1 and of the front extremities of the girders 17 of the main frame 13. The driver can therefore easily bring the rear ends of the girders 2 to a point just below the front ends of the girders 17 on the rear frame 13, in a position substantially, if not exactly, centered between the lateral wings 17b and 17c of the two inverted U profiled structures making up the girders 17.

Next, the piston rods of the hydraulic cylinders 9 and the hydraulic cylinders incorporated in the lifting and steering devices 7 are extended slowly, as indicated by the arrows F5 in FIG. 12. The main frame 1 is thus raised slowly until the upper surface of each of the two corner-shaped structures 27, located at the rear end of the two girders 2, just makes contact with the roller 31 at the front end of each of the two girders 17 on the auxiliary frame 13, so that each of the struts 49 is relieved of at least part of the weight of the auxiliary frame 13 and harvesting equipment 14. However the feet of the struts 49 are not lifted, even to the slightest extent, from the ground 10. During this operation, the two corner-shaped structures at the rear end of the girders 2 may co-operate with the wings 29 at the front end of the girders 17 in order to ensure centering of the rear extremities of the girders 2 in relation to the front ends of the girders 17 where necessary.

Next, the straddle carrier is moved further back below the auxiliary frame 13, as indicated by the arrow F6 in FIG. 13, until the V-shaped stops on the girders 2 of the main frame 1 come to rest against the V-shaped stops 36 on the girders 17 of the auxiliary frame 13 and ensure a possible centering for the rear extremities of the girders 2 with respect to the rear extremities of the girders 17. During this operation, the rollers 31 ride along the upper surface of the girders 2 until their lower part engages or is at least positioned in the openings 42 of the girders 2 at the moment when the stops 36 and 37 come to contact each other. At that moment, the male truncated cone parts 38 are aligned with the respective female truncated cone parts 39.

Figure 14:
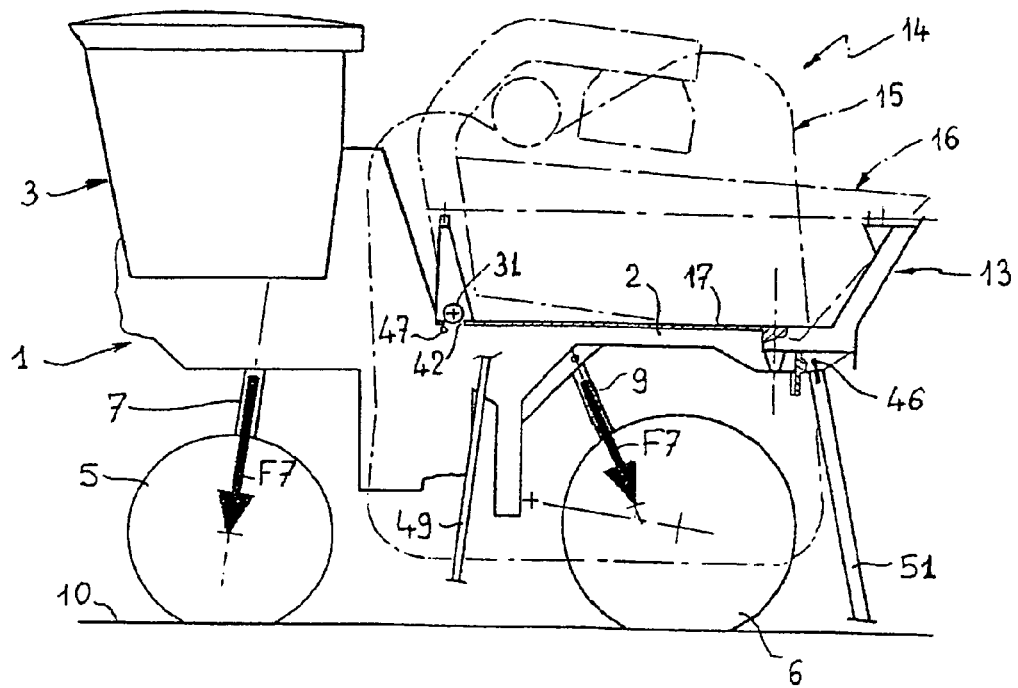

Next, the hydraulic cylinders 9 and the hydraulic cylinders incorporated in the lifting and steering devices 7 are extended completely as indicated by the arrows F7 in FIG. 14, in order to raise the main frame 1. During this operation, the support pieces 2b in the girders 2 are brought into contact with the lower face of the upper wall 17a of the girders 17 if they were not in contact already, and then the girders 17 pivot about the virtual axis defined by the contact points between the support pieces 2b and the girders 17 (the angle α decreases). At the same time, the stops 37 slide vertically along the stops 36 and the female parts 39 couple together with the male parts 38. Simultaneously, the rollers 31 move into the openings 42 if they were not already in there, and the holes 47 on the girders 2 become aligned with the holes 48 at the front end of the girders 17. When the piston rods of the cylinders are completely extended, the feet of the struts 49 and 51 are lifted from the ground 10 as shown in FIG. 14. At that moment, the bolts 43 can be inserted through the smooth holes 44 in the female parts 39, screwed into the threaded holes 45 in the male truncated cone parts 38 and firmly tightened in order to prevent uncoupling of the male and female parts 38 and 39 during any subsequent use of the self-propelled straddle carrier equipped with the harvesting equipment 14.

The two locking pins 46 may then be removed in order to allow removal of the two rear struts 51. Next, the two locking pins 46 are inserted into the aligned holes 47 and 48 in order to lock the front extremities 17 of the auxiliary frame 13 to the girders 2 of the main frame 1.

The electrical wire harnesses and all the hoses for actuation of the hydraulic cylinders, including those for the hydraulic cylinders associated with the two bins 16, are then connected to the self-propelled straddle carrier. Next, the hydraulic cylinders associated with the bins 16 are actuated in order to slightly lift the bins and thus allow removal of the front struts 49. The bins 16 are then lowered back into their normal transport position.

Finally, the piston rods of the hydraulic cylinders 9 and the hydraulic cylinders included in the lifting and steering devices 7 are retracted at least partially in order to bring the self-propelled straddle carrier back to its road configuration. The straddle carrier is then ready for use as a grape-harvesting machine.

The tests carried out by the applicant have shown that the total time required for performing the installation and coupling of the auxiliary frame 13 and harvesting equipment 14 to the main frame 1 of the self-propelled straddle carrier is not more than 20 minutes, including 10-12 minutes for the approach and coupling of the auxiliary frame 13 to the main frame 1. This is a much shorter time than that required for the straddle carriers described in FR-A-2 536 949 and FR-A-2 554 668 mentioned above.

Figure 15:
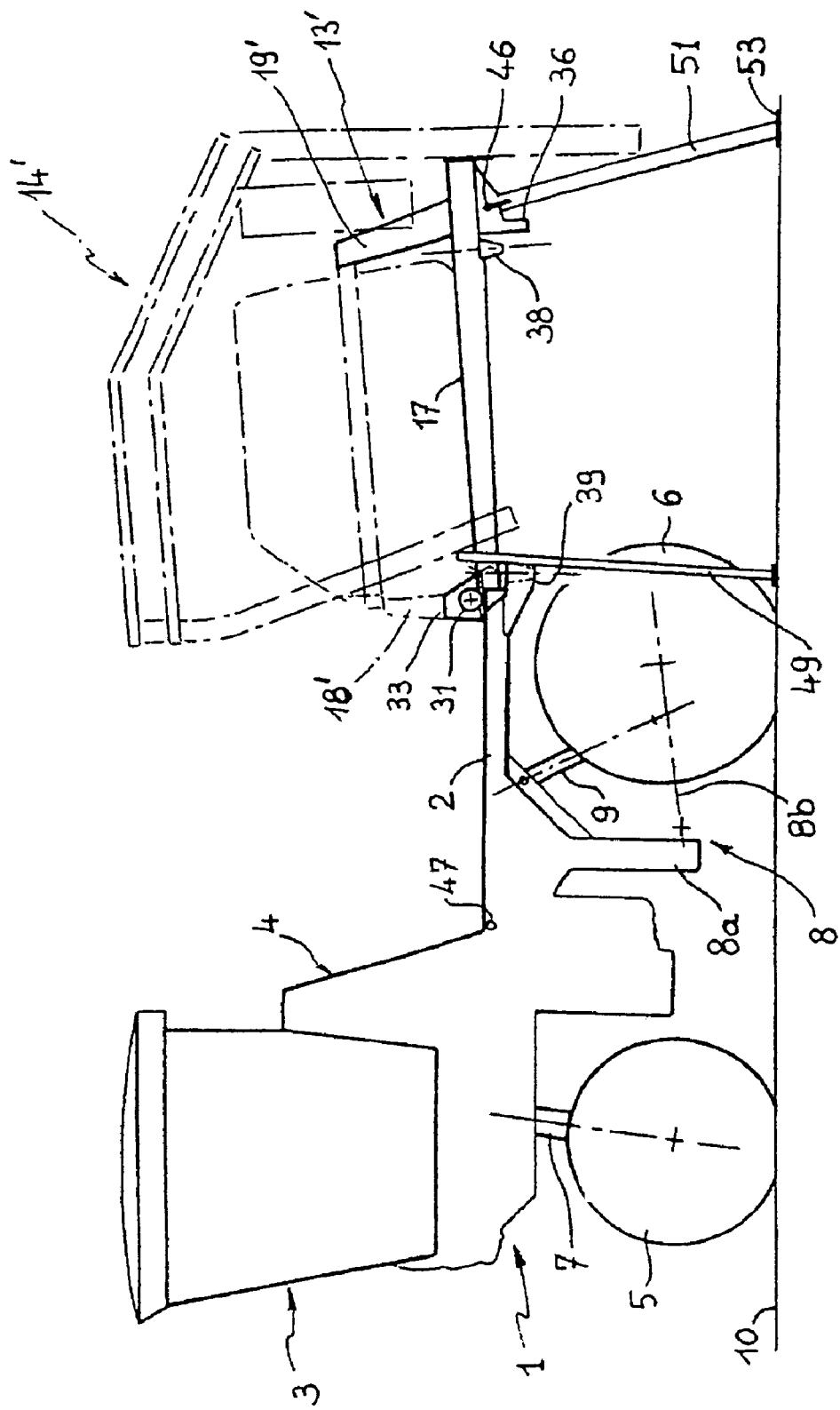
FIG. 15 is a schematic diagram similar to FIG. 12, showing the self-propelled multi-purpose straddle carrier and an auxiliary frame bearing a sprayer equipment, at the beginning of the alignment phase.

FIG. 15 offers a view similar to FIG. 12, showing (in phantom lines) an spraying equipment 14' being installed on the main frame 1 of the self-propelled straddle carrier described above. Here, the equipment 14' is borne by an auxiliary frame 13' supported on the ground 10 by struts 49 and 51 identical to those described above in relation to the auxiliary frame 13 of the harvesting equipment 14. Elements 17, 31, 33, 36 and 38 of the auxiliary frame 13' are identical to the corresponding auxiliary frame 13 and will not be described in detail again. In fact, the auxiliary frame 13' is almost identical to the auxiliary frame 13, with the exception of the front crossbar 18', the rear crossbar 19' and other support structures that are more specifically adapted for receiving and supporting the spraying equipment 14' or other elements associated therewith. The spraying equipment is of a common type and a detailed description will not be given as it is not necessary for understanding of the invention.

Given the great similarity between the auxiliary frames 13 and 13', it will be readily understood that installation of the equipment 14' on the main frame 1 of the self-propelled straddle carrier, and its removal from the main frame 1, can be performed in a manner very similar to the procedure described above for the installation and removal of the equipment 14.

Of course, other items of equipment such as tillage equipment, devices for pruning vines or other fruit-bearing shrubs planted in rows, work platforms or other material can be provided for selective installation on the main frame 1 of the self-propelled straddle carrier in stead of the equipment 14 or 14'. Each time, the equipment is fitted with an auxiliary frame similar to the auxiliary frames 13 and 13' described above.

In addition, it is understood that the above description of an embodiment of the invention has been given only by way of example and that it is not limiting in any way, and that alternatives may be developed by people skilled in the art without departing from the scope of the invention as defined by the claims.

For example, the girders 2 of the main frame may each have, for at least part of their length, a structure that forms a channel suitable for receiving the girders of the auxiliary frame, which may in this case take the form of caisson girders.

In the same way, the respective positions of the male and female coupling elements 38 and 39 may be reversed; that is, the male truncated cone parts may be affixed to the girders 2 of the main frame 1, while the female parts 39 may be affixed to the girders 17 of the auxiliary frame 13.

The harvesting equipment 14 may include a belt conveyor for transporting the harvested crop continuously into a trailer drawn by a tractor moving along a neighbouring row. In this case, instead of being installed on the main frame of the self-propelled straddle carrier, as is the case with the prior harvesting machines, it is preferable to install the belt conveyor directly on the auxiliary frame 13, replacing at least one of the two bins 16. This will allow a considerable time saving when the evacuation belt has to be removed at the same time as the harvesting equipment.

Further, the angle ($\alpha$) of the frame may also be realised by other mechanism than the difference in length between the front and rear struts. For example, it is possible to choose struts of equal length, but to attach them to the auxiliary frame at different heights. The attachment points for the front struts may be located higher than the attachment points for the rear struts.

The invention claimed is:

1. Mechanism for mounting equipment intended for installation on a multi-purpose self-propelled straddle carrier for the cultivation, treatment and harvesting of fruit-bearing shrubs planted in rows, said mounting mechanism comprising:
   - on the straddle carrier, a main frame mounted on ground-engaging wheels with lifting devices between the wheels and the main frame for selective lifting and lowering of the main frame with respect to the ground;
   - on the equipment an auxiliary frame suitable for connection to the main frame using detachable connection mechanism;
   - a number of elongate supports for supporting the auxiliary frame on the ground when the auxiliary frame is separated from the main frame;
   - the main frame and the auxiliary frame both including two parallel and substantially horizontal girders,
   - characterized in that said mounting mechanism further comprise;
   - on one of the main or auxiliary frames, longitudinal guidance mechanism, operable to co-operate with the two girders on the other frame for guiding the two frames with respect to each other when the main frame moves longitudinally in relation to the auxiliary frame while being supported by the elongate supports; and
   - a stop member on at least one of the frames, able to co-operate with the other frame for limiting the longitudinal path of travel of the main frame along the auxiliary frame and to define a stop position that allows the two frames to be assembled and affixed using said connection mechanism.

2. Mounting mechanism according to claim 1, wherein said elongate supports comprise two front elongate supports and two rear elongate supports with lengths and points of connection to the auxiliary frame, so that the two girders of the auxiliary frame are inclined at an angle of between 4-5° to the horizontal when the auxiliary frame is supported by the elongate supports.

3. Mounting mechanism according to claim 2, wherein said two girders on one of the two frames have a predetermined spacing and comprise each a caisson girder, and the two girders on the other frame have the same predetermined spacing and a structure forming a channel suitable for receiving one of the two caisson girders, said channel constituting said longitudinal guidance mechanism.

4. Mounting mechanism according to claim 3, wherein said two caisson girders belong to the main frame and have a rectangular cross-section, and the two girders of the auxiliary frame have, at least for a substantial part of their length, profiled structure with a transverse section in the shape of an inverted U.

5. Mounting mechanism according to claim 4, wherein said auxiliary frame comprises, at the front end of each profiled structure, an anti-friction device suitable for contacting the upper surface of the corresponding girder in the main frame which is received into the profiled structure.

6. Mounting mechanism according to claim 5, wherein said anti-friction device is a roller mounted to rotate about an axis located above an upper surface of the profiled structure and partly protruding into the interior of the profiled structure through an opening made in the upper surface of the profiled structure.

7. Mounting mechanism according to claim 6, wherein said upper surface of each caisson girder in the main frame comprises an opening or cavity suitable for receiving a lower part of the roller when the main frame is in the stop position defined by the stop members.

8. Mounting mechanism according to claim 7, wherein each of said two girders on the main frame and each of said two girders on the auxiliary frame are provided in the area adjacent their rear ends, with a male truncated cone part of the girder and a female truncated cone part on the other, the two male parts and the two female parts being suitable for mating into each other through vertical displacement of the main frame relative to he auxiliary frame while the main frame is in the stop position, defined by the stop members.

9. Mounting mechanism according to claim 8, wherein said female parts each have a smooth axial.hole at the bottom of their truncated cone-shaped cavity, the male parts each have a threaded axial hole, and the detachable connection mechanism comprise two bolts that pass through the smooth holes of the female parts and are screwed into the threaded holes in the male parts.

10. Mounting mechanism according to claim 9, wherein each of the caisson girders in the main frame ends at its rear end in a corner-shaped structure with lateral faces that converge both backwardly and upwardly.

11. Mounting mechanism according to claim 10, wherein each of the two female parts is affixed to the rear end of the corresponding caisson girder such that they are offset backwards and downwards with respect to the corner-shaped structure, and the stop members, include, on the one hand, a first pair of vertical plates of sheet metal bent into a V and affixed to the respective female parts behind them, and, on the other hand, a second pair of vertical plates of sheet metal bent into a V, which plates are affixed to the respective profiled structures on the auxiliary frame, extend downwards from the profiled structures behind the male truncated cone parts and have vertical dimensions of approximately twice the vertical dimensions of the male truncated cone parts.

12. Mounting mechanism according to claim 11, characterized in each of the two profiled structures of the auxiliary frame has lateral wings that diverge both forwardly and downwardly.

13. Mounting mechanism according to claim 12, wherein each of the two profiled structures on the auxiliary frame has at least one lateral wing with a vertical dimension that increases from front to back along the auxiliary frame.

14. Mounting mechanism according to claim 13, wherein said rear part of the auxiliary frame, at least one of the two lateral wings of each profiled structure has a lower part that diverges laterally and downwardly while extending away from the other lateral wing.

15. Mounting mechanism according to claim 14, wherein the detachable connection mechanism further comprises two locking pins, inserted into holes with horizontal axes, provided in each girder of the auxiliary frame and in each corresponding girder of the main frame, said holes being aligned only when the lower part of the roller has entered the opening or cavity.

16. A method for mounting of equipment selected from a variety of various items onto a multi-purpose self-propelled straddle carrier for the cultivation, treatment and harvesting of fruit-bearing shrubs planted in rows, said self-propelled straddle carrier comprising a main frame suitable for lifting and lowering and comprising a first pair of parallel and spaced girders, the equipment being supported by elongate supports when in a state of waiting prior to installation on the self-propelled straddle carrier, and comprising an auxiliary frame suitable for connection to the main frame by detachable connection mechanism and comprising a second pair of girders, said method being characterized in that it comprises:

a) using, for one of the first and second pairs of girders, two girders having each a structure that forms a channel suitable for receiving and guiding one of the girders of the other pair of girders during longitudinal displacement of the main frame with respect to the auxiliary frame supported by the elongate supports;
 b) moving the self-propelled straddle carrier to a position so that each of the girders of the first pair is aligned in substantially the same vertical plane as a corresponding girder from the second pair, and the end of each of the girders of the first pair is at a level lower than the first end of the corresponding girder of the second pair of girders;
 c) raising the main frame over a distance sufficient to make the respective ends of the first and second pairs of girders engage, the one within the other;
 d) moving the main frame longitudinally with respect to the auxiliary frame to a position defined by the mutual engagement of stop members;
 e) raising the main frame further such that the first pair of girders carries the second pair of girders, the auxiliary frame and the equipment borne by that frame, and eliminating the load from the weight of the auxiliary frame and the equipment unloading on the elongate supports;
 f) affixing the auxiliary frame to the main frame using the detachable connection mechanism;
 g) removing the elongate supports; and
 h) lowering the main frame to bring the carrier to the required level for road transport or for operation of the installed equipment.

17. A method according to claim 16, wherein:
 said method involves use of the elongate supports that have lengths and points of connection to the auxiliary frame such that the two girders on the auxiliary frame are inclined upwards from their first end to their other end at an angle between 4-5° to the horizontal when the auxiliary frame is supported by the said elongate supports, and
 step (e) of the lifting procedure includes a substep during which the two girders in the auxiliary frame pivot around a virtual axis defined by the points of contact between the first ends of the two girders of the auxiliary frame and the two girders on the main frame.

18. A method according to claim 17, wherein said pivoting step comprises a positioning step during which the male and female conical parts affixed to the girders couple together automatically to ensure precise positioning of the other ends of the girders on the auxiliary frame in relation to the girders on the main frame.

19. A method according to claim 18, wherein during step (d), an anti-friction device between the main frame and the auxiliary frame is used.

* * * * *